United States Patent [19]

Kühling et al.

[11] Patent Number: 5,652,313
[45] Date of Patent: Jul. 29, 1997

[54] TWO-STAGE PROCESS FOR THE MANUFACTURE OF THERMOPLASTIC POLYCARBONATE

[75] Inventors: Steffen Kühling, Meerbusch; Uwe Hucks, Alpen; Gottfried Zaby, Leverkusen; Claus Wulff, Krefeld, all of Germany

[73] Assignee: Bayer Aktiengesellschaft, Leverkusen, Germany

[21] Appl. No.: 594,688

[22] Filed: Jan. 31, 1996

[30] Foreign Application Priority Data

Feb. 13, 1995 [DE] Germany .................. 195 04 622.6

[51] Int. Cl.$^6$ .................................................. C08F 2/00
[52] U.S. Cl. ............... 526/65; 264/176.1; 264/211.24; 528/196; 528/198; 528/199; 528/200; 528/502 B
[58] Field of Search ............... 526/65; 528/196, 528/198, 199, 200, 502; 264/176.1, 211.24

[56] References Cited

U.S. PATENT DOCUMENTS

| 3,442,854 | 5/1969 | Curtius et al. | 528/199 |
| 5,340,905 | 8/1994 | Kuhling et al. | 528/199 |
| 5,399,659 | 3/1995 | Kuhling et al. | 528/199 |
| 5,432,250 | 7/1995 | Yamato et al. | 528/196 |

FOREIGN PATENT DOCUMENTS

| 481 296 | 11/1992 | European Pat. Off. . |
| 529 093 | 3/1993 | European Pat. Off. . |
| 24 39 552 | 2/1976 | Germany . |
| 42 38 123 | 5/1994 | Germany . |
| 43 12 390 | 10/1994 | Germany . |

*Primary Examiner*—Terressa Mosley
*Attorney, Agent, or Firm*—Connolly and Hutz

[57] ABSTRACT

The present invention provides a two-stage melt process for the manufacture of thermoplastic, solvent-free, low-branched polycarbonates with low OH end-group contents with the use of ammonium or phophonium catalysts in the first stage and alkali and alkaline earth catalysts in the second stage.

4 Claims, No Drawings

TWO-STAGE PROCESS FOR THE MANUFACTURE OF THERMOPLASTIC POLYCARBONATE

The present invention provides a two-stage melt process for the manufacture of solvent-free, low-branched polycarbonates, starting from aromatic diphenols, carbonic acid diaryl esters, catalysts and optionally branching agents at temperatures between 80° C. and 400° C. and pressures of 1000 mbar to 0.01 mbar, that is characterized in that for the first stage, the oligocarbonate synthesis, nitrogen or phosphorus bases are used in amounts of $10^{-2}$ to $10^{-8}$ mole, relative to 1 mole diphenol, after addition of the catalyst and application of vacuum (from atmospheric pressure to 0.5 mbar) and raising of the temperature (up to 300° C.) an oligocarbonate is produced by the distilling-off of monophenols, and in the second stage the oligocarbonate is polycondensed to the polycarbonate with the addition of alkali metal salts and alkaline earth metal salts in amounts of $10^{-4}$ to $10^{-8}$ mole, relative to 1 mole diphenol, at temperatures between 250° C. and 400° C., preferably between 275° C. and 360° C., and pressures of less than 500 mbar to 0.01 mbar in short times (less than 1 hour), the oligocarbonate formed as intermediate having an OH end-group content of more than 10% and less than 35%, preferably of more than 15% and less than 30%.

The polycarbonates manufactured according to the process of the invention are low-branched and solvent-free and have light self-colour and low OH end-group contents.

In U.S. Pat. No. 3,442,854, quaternary ammonium/phosphonium compounds are described as catalysts in the melt transesterification. In the polycondensation stage, however, in order to arrive at high-molecular polycarbonate, reaction temperatures exceeding 300° C. were used for several hours (more than 4 h). These products are not low-branched (see Comparative Examples 1 and 2) and the space-time yield is unsatisfactory.

In DE-OS 4 238 123 (Le A 29 275) and in U.S. Pat. No. 5,340,905 it is reported that quaternary ammonium or phosphonium compounds are suitable as catalysts for the melt transesterification of an aromatic dihydroxy compound and a carbonic acid diester for the preparation of solvent-free, low-branched polycarbonate if the polycondensation temperature is below 295° C. and only one catalyst is used. The process requires relatively long reaction times in the polycondensation phase compared with the process according to the invention.

In DE-OS 4 312 390 (Le A 29 618) it is reported that with ammonium and phosphonium catalysts an oligocarbonate can be prepared, and the latter can be polycondensed in a second stage in short times with the aid of alkali metal salts and alkaline earth metal salts to low-branched light-coloured polycarbonate. If in this process, however, attention is not paid to the OH/aryl carbonate end-group ratios, polycarbonates with high OH end-group ratios are obtained (see Comparative Example 3), which lead to a definite worsening of the products in the thermal aging.

It has now been found that by adjustment of a definite OH/aryl carbonate end-group ratio of the oligocarbonates formed as intermediates and by two-stage catalysis with intensive surface renewal, a low-branched polycarbonate, low in OH end groups can be obtained in short polycondensation times.

Low-branched in the sense of the process of the invention means that the content of the branching agent of formula (I):

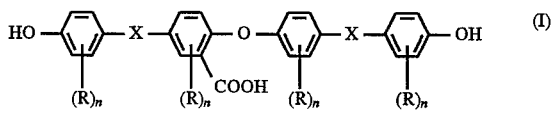

with

X=$C_1$–$C_8$-alkylidene or cycloalkylidene, S or a single bond and R=$CH_3$, Cl or Br and n is 0, 1 or 2, in the polycarbonate does not, according to total saponification and HPLC determination, exceed a value of 75 ppm.

Diphenols suitable for the process according to the invention are those of formula (II):

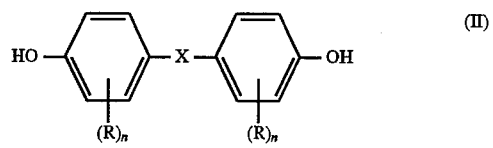

wherein X, R and n have the meaning quoted for formula (I).

Preferred diphenols are e.g.:
4,4'-dihydroxydiphenyl,
4,4'-dihydroxydiphenyl sulphide,
2,2-bis(4-hydroxyphenyl)propane,
2,2-bis(3,5-dimethyl-4-hydroxyphenyl)propane,
2,2-bis(3,5-dichloro-4-hydroxyphenyl)propane,
2,2-bis(3,5-dibromo-4-hydroxyphenyl)propane,
1,1-bis(4-hydroxyphenyl)cyclohexane and
1,1-bis(4-hydroxyphenyl)-3,3,5-trimethylcyclohexane.

Particularly preferred diphenols from those aforementioned are 2,2-bis(4-hydroxyphenyl)propane and 1,1-bis(4-hydroxyphenyl)-3,3,5-trimethylcyclohexane.

Carbonic acid diesters in the sense of the present invention are di-$C_6$–$C_{20}$-aryl esters, preferably the diesters of phenol or alkyl-substituted phenols, thus diphenyl carbonate or e.g. dicresyl carbonate. The carbonic acid diesters are used in an amount of 1.01 to 1.30 mole, preferably 1.02 to 1.15 mole, relative to 1 mole bisphenol.

Care must be taken that the reaction components for the first stage (oligocarbonate synthesis), that is the diphenols and the carbonic acid diaryl esters, are free from alkali metal and alkaline earth metal ions, amounts of less than 0.1 ppm of alkali metal and alkaline earth metal ions being tolerable. Diphenols of such purity are obtainable by recrystallizing, washing and/or distilling the carbonic acid diaryl esters or diphenols. In the process according to the invention the content of alkali metal and/or alkaline earth metal ions both in the diphenol and in the carbonic acid diester should have a value of less than 0.1 ppm. The total chlorine content of the raw materials should not exceed a value of 2 ppm and the content of saponifiable chlorine of the carbonic acid diester should not exceed a value of 0.05 ppm. For the colour (YI value) of the resulting polycarbonate, it is advantageous if the raw materials, that is the diphenols and/or the carbonic acid diaryl esters, in the case of a purification by distillation of the raw materials in the last stage of manufacture, have not passed through the solid phase and are used directly as melt for the transesterification reaction (compare Examples 3 to 8).

The polycarbonates can be branched deliberately and in a controlled manner by the use of small amounts of branching agents. Some suitable branching agents are: phloroglucinol,
4,6-dimethyl-2,4,6-tri(4-hydroxyphenyl)heptene-2,
4,6-dimethyl-2,4,6-tri(4-hydroxyphenyl)heptane,
1,3,5-tri(4-hydroxyphenyl)benzene,
1,1,1-tri(4-hydroxyphenyl)ethane,
tri(4-hydroxylphenyl)phenylmethane,
2,2-bis[4,4-bis(4-hydroxyphenyl)cyclohexyl]propane,
2,4-bis(4-hydroxyphenylisopropyl)phenol, 2,6-bis(2-hydroxy-5'-methylbenzyl)-4-methylphenol,
2-(4-hydroxyphenyl)-2-(2,4-dihydroxyphenyl)propane,
hexa(4-(4-hydroxyphenylisopropyl)phenyl) orthoterephthalate,
tetra(4-hydroxyphenyl)methane,
tetra(4-(4-hydroxyphenylisopropyl)phenoxy)methane,
1,4-bis(4',4"-dihydroxytriphenyl)methyl)benzene and in particular α,α',α"-tris(4-hydroxyphenyl)-1,3,5-triisopropylbenzene.

Further possible branching agents are 2,4-dihydroxybenzoic acid, trimesic acid, cyanuric chloride and 3,3-bis(3-methyl-4-hydroxyphenyl)-2-oxo-2,3-dihydroindole.

The 0.05 to 2 mole %, relative to the diphenols used, of branching agents for optional concomitant use can be fed together with the diphenols.

For the oligocarbonate synthesis, nitrogen and phosphorus bases are used as catalysts, preferably ammonium and phosphonium catalysts (see 3 and 4) as well as guanidine and phosphazene bases.

Preferred catalysts for the purposes of the process according to the invention for the preparation of the oligocarbonate intermediate are compounds of the general formulae (III) and (IV):

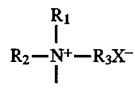

(III)

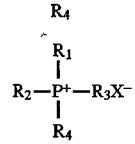

(IV)

wherein $R_{1-4}$ can be the same or different $C_1$–$C_{20}$-alkyls, $C_6$–$C_{18}$- aryls or $C_3$–$C_{20}$-cycloalkyls and $X^-$ can be an anion for which the corresponding acid-base pair $H^+ + X^- \Leftrightarrow HX$ has a $pK_B$ of less than 11.

Catalysts for the purposes of the process according to the invention are for example:
tetramethylammonium hydroxide, tetramethylammonium acetate, tetramethylammonium fluoride, tetramethylammonium tetraphenylboranate, tetraphenylphosphonium fluoride, tetraphenylphosphonium tetraphenylboranate, dimethyldiphenylammonium hydroxide, tetraethylammonium hydroxide, DBU, DBN or guanidine systems such as for example 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidene-di-1,5, 7-triazabicyclo [4.4.0]dec-5-ene, 7,7'-decylidene-di-1, 5,7-triazabicyclo [4.4.0]dec-5-ene and 7,7'-dodecylidene-di-1,5,7-triazabicyclo[4.4.0]dec-5-ene or phosphazenes such a for example the phosphazene base $P_1$-t-oct=tert-octyliminotris(dimethylamino) phosphorane, the phosphazene base $P_1$-t-butyl=tert-butyliminotris(dimethylamino)-phosphorane and BEMP=2-tert-butylimino-2-diethylamino-1,3-dimethylperhydro-1,3-diaza-2-phosphorin.

These catalysts are used in amounts of $10^{-2}$ to $10^{-8}$ mole, relative to 1 mole diphenol. The catalysts can also be used in combination (of two or more) with each other. The catalysts used in the first stage are volatile substances which after oligocondensation are no longer detectable in the oligocarbonate.

The oligocarbonates of the first stage have average molecular weights $M_W$ of 9000–24,000, preferably 12,000–20,000, determined by measurement of the relative solution viscosity in dichloromethane or in mixtures of equal parts by weight of phenol and o-dichlorobenzene, calibrated by light scattering. The molecular weights of the oligocarbonates of the first stage are governed by the desired final viscosity of the polycarbonates; thus by the condensation of low-molecular oligocarbonates, low-molecular polycarbonates are obtained in the second stage and by the condensation of relatively high-molecular oligocarbonates, relatively high-molecular polycarbonates are obtained. The oligocarbonates so prepared must have an OH end-group content $$X\% = \frac{\text{number of OH end groups}}{\text{total number of end groups}} \times 100$$

of more than 10% and less than 35%, preferably of more than 15% and less than 30%.

The OH/aryl carbonate end group ratio of the oligocarbonates was determined by separate determination of the OH end groups by photometric determination with $TiCl_4$ on the one hand and determination of the aryl carbonate end groups by HPLC determination of the monophenol formed after total saponification on the other hand.

The temperature for the preparation of these oligocarbonates is between 100° C. and 300° C., preferably between 150° C. and 280° C. The monophenols arising during the transesterification to the oligocarbonate are removed by application of a vacuum of 1 bar to 0.5 mbar, preferably less than 500 mbar to 1 mbar.

In the second stage, the polycondensation of the oligocarbonate, the low-branched polycarbonate is produced by addition of an alkali/alkaline earth metal catalyst to the oligocarbonate and by further raising of the temperature to 250°–400° C., preferably to temperatures of 275°–360° C., especially to temperatures of 280° C. to 320° C. and a pressure of less than 500 mbar to 0.01 mbar.

The alkali/alkaline earth metal catalysts are used in amounts of $10^{-4}$ to $10^{-8}$ mole relative to 1 mole diphenol, particularly preferably in a concentration of $10^{-5}$ to $10^{-7}$ molar. They are for example the lithium, sodium, potassium, caesium, calcium, barium and magnesium hydroxides, carbonates, halides, phenolates, diphenolates, fluorides, acetates, phosphates, hydrogen phosphates and boranates or, more generally expressed all $M_x^{n+} X_y^{n-}$ with $x \cdot n^+ + y n^- = 0$ and $X^{n-}$ is an anion for which the corresponding acid-base pair, $H^+ + X^- \Leftrightarrow HX$, has a $pK_B$ value of less than 11.

The alkali/alkaline earth metal catalyst can be added e.g. as solid or as solution/masterbatch e.g. in water, phenol, diaryl carbonate, oligocarbonate, or polycarbonate.

The reaction of the aromatic dihydroxy compound and the carbonic acid diester can be carried out for the purposes of the 2-stage process according to the invention continuously or discontinuously, for example in agitated tanks, thin-film evaporators, series of stirred-tank reactors, simple disk reactors and high-viscosity disk reactors.

The last step, the polycondensation, is preferably carried out in short times of less than 1 h, preferably less than 30 min, particularly preferably less than 15 min, and in particular less than 10 min. High-viscosity reactors, in particular screw mixer machines, e.g. a ZSK twin-screw kneader, are suitable for this.

The aromatic polycarbonates of the process according to the invention should have weight-average molecular weights $M_W$ of 18,000 to 60,000, preferably 19,000 to 40,000, determined by measurement of the relative solution viscosity in dichloromethane or in mixtures of equal parts by weight of phenol and o-dichlorobenzene, calibrated by light scattering.

This is achieved by polycondensing preferably low-molecular oligocarbonates by monophenol distillation to lower viscosity polycarbonates and higher-molecular oligocarbonates to higher-viscosity polycarbonates.

The OH end-group contents of the polycarbonates are less than 20% preferably less than 15%, particularly preferably less than 10% and especially less than 5%.

The oligocarbonates can also be isolated, e.g. granulated, and thereafter polycondensed in a separate step.

For limitation of the weight-average molecular weights $M_W$ of the polymers, molecular-weight regulators, such as e.g. alkylphenol, can be used in known manner (EP 360 578) in the calculated amounts.

For the improvement of the properties, auxiliary substances and reinforcing substances can be admixed with the polycarbonates manufactured according to the invention. Substances which can be taken into consideration include: stabilizers, flow aids, mould release agents, fireproofing agents, pigments, finely divided minerals, fibrous materials, e.g. alkyl and aryl phosphites, phosphates and phosphanes, low-molecular carboxylic acid esters, halogen compounds, salts, chalk, quartz flour, and glass and carbon fibres.

Other polymers, furthermore, e.g. polyolefins, polyurethanes or polystyrenes, can also be admixed with the polycarbonates according to the invention.

These substances are preferably added in conventional units to the finished polycarbonate but can be added, according to the requirements, in another stage of the process according to the invention.

Beyond that, for particular applications the modification of the polycarbonates by the incorporation by condensation of blocks, segments and comonomers is also possible, e.g. the incorporation of siloxane blocks with OH end groups, of aromatic and aliphatic polyesters with OH and carboxylic acid end groups, of polyphenylene sulphide blocks with OH end groups and of polyphenylene oxide blocks with OH end groups.

EXAMPLES

Comparative Example 1

114.15 g (0.500 mole) bisphenol A and 113.54 g (0.530 mole) diphenyl carbonate are weighed into a 500 ml three-necked flask with stirrer, internal thermometer and Vigreux column (30 cm, metallized) with bridge. Atmospheric oxygen is removed from the apparatus by applying a vacuum and flushing with nitrogen (3 times) and the mixture is heated to 150° C. 0.0039 g $N(CH_3)_4B(C_6H_5)_4$ ($2\times10^{-3}$ mole %, relative to bisphenol A) is now charged as a solid and the phenol formed distilled off at 100 mbar. Simultaneously the temperature is increased to 250° C. After 1 hour the vacuum is improved to 10 mbar. By lowering the vacuum to 0.5 mbar and raising the temperature to 310° C. polycondensation is attained in 4 h. A light-coloured solvent-free polycarbonate with a relative solution viscosity of 1.276 (dichloromethane, 25° C., 5 g/l) is obtained. The content of the branching agent of formula 5 in the polycarbonate prepared is 210 ppm.

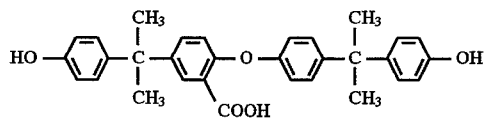
(V)

Comparative Example 2

As Example 1, except that the polycondensation temperature is 320° C. A light-coloured solvent-free polycarbonate with a relative solution viscosity of 1.335 (dichloromethane, 25° C., 5 g/l) is obtained. The content of the branching agent of formula 5 in the polycarbonate prepared is 410 ppm.

Example 1

5130 g (22.5 mole) bisphenol A, 5104 g (23.85 mole) diphenyl carbonate and 148 mg $PPh_4BPh_4$ ($1\times10^{-3}$ mole %) are weighed into a 25 l agitated vessel. The vessel is rendered inert with nitrogen and the raw materials fused in 15 minutes by heating to 200° C. At a mass temperature of 100° C. the stirrer is switched on and a vacuum of 300 mbar applied. The temperature is maintained for 1 hour at 200° C. and liberated phenol distilled off via a column. In the course of a further hour the temperature is raised to 250° C. and the vacuum improved to 100 mbar and thereafter at 250° C. within 30 minutes to 5 mbar. After aeration with nitrogen the oligocarbonate is discharged from the vessel and granulated. An oligocarbonate with a relative solution viscosity of 1.156 (dichloromethane, 25° C., 5 g/l) is obtained. The phenolic OH content of this oligocarbonate amounts to 930 ppm or 22%. After spinning $5\times10^{-4}$ mole sodium phenolate onto the oligocarbonate, polycondensation is carried out in a ZSK 32 twin-screw kneader (100 rpm; 280° C.; 4.5 kg/h) with a residence time of 2 min. The polycarbonate so isolated has a relative solution viscosity of 1.286 (dichloromethane, 25° C., 5 g/l), the content of the branching agent of formula (5) is 14 ppm, and the content of OH end groups is 260 ppm or that is to say 11%.

Example 2

As Example 1, except that 89.2 mg $NMe_4BPh_4$ ($1\times10^{-3}$ mole %) are weighed in. An oligocarbonate with a relative solution viscosity of 1.164 (dichloromethane, 25° C., 5 g/l) and a phenolic OH content of 830 ppm or, that is to say, 20% is obtained. The content of branching agent of formula (5) in the oligocarbonate prepared is less than 2 ppm. After aeration at 290° C., 7.8 mg sodium phenolate ($3\times10^{-4}$ mole %) are added and the oligocarbonate polycondensed as described in Example 1. The relative solution viscosity of the polycarbonate isolated is 1.295 (dichloromethane, 25° C., 5 g/l), the content of the branching agent of formula (5) is 16 ppm and the phenolic OH content 210 ppm or that is to say 9%.

Comparative Example 3

As Example 1, except that there are 5130 g (22.5 mole) bisphenol A and 5013 g (23.43 mole) diphenyl carbonate. After aeration with nitrogen, the oligocarbonate is discharged from the vessel and granulated. An oligocarbonate with a relative solution viscosity of 1.171 (dichloromethane, 25° C., 5 g/l) is obtained. The phenolic OH content of this oligocarbonate is 1800 ppm or that is to say 46%. After spinning $5\times10^{-4}$ mole% sodium phenolate on the polycarbonate, polycondensation is carried out in a ZSK 32 twin-screw kneader (100 rpm; 280° C.; 4.5 kg/h) with a residence time of 2 min. The relative solution viscosity of the polycarbonate thus isolated is 1.322 (dichloromethane, 25° C., 5 g/l), the content of the branching agent of formula (5) is 24 ppm and the OH end-group content 750 ppm or that is to say 36%.

Examples 3 to 8

In a semitechnical experimental plant the raw materials diphenyl carbonate and bisphenol A can be fused in several vessels separately or together after rendering inert with nitrogen. It is also possible to receive raw materials delivered as liquid. The melts can be continuously metered separately or as a mixture.

In the case of separate metering, 49.37 kg BPA/h and 52.83 kg DPC/h are delivered, and as a mixture 102.2 kg melt (from 175 parts by weight of BPA and 187.25 parts by weight of DPC)/h.

$PPh_4BPh_4$ as a 1% solution in phenol is continuously admixed as catalyst before entry into the reactors (142 g solution/h, corresponding to $1\times10^{-3}$ mole %).

The melt is heated via a heat exchanger to 190° C. and after 20 min residence time flash-evaporated via a tubular evaporator into a separator with agitator maintained at a vacuum of 150 mbar and simultaneously heated to 240° C. The residence time in the separator is 25 min. The vapour is passed via a column into a condenser. The oligocarbonate is conveyed from the separator into a disk reactor. The temperature is adjusted to 280° C. and the vacuum to 1.5 mbar. The residence time is 35 min. The oligocarbonate formed is continuously mixed with $5\times10^{-4}$ mole % sodium phenolate as catalyst in the form of a 0.1 wt % masterbatch in polycarbonate (126 g/h) and conveyed to a twin-screw kneader (ZSK 57). The condensation to high-molecular polycarbonate occurs at 0.2 mbar, temperatures of 310° C. and 100 rpm. The residence time is 3 min. In both cases the vapour is led into cooled separators. The polycarbonate formed is discharged as bristle and granulated.

| Experiment | BPA | DPC | $\eta_{rel}$ oligocarbonate | —OH [ppm] | —OH in mole % of the end groups | $\eta_{rel}$ polycarbonate | —OH [ppm] | —OH in mole % of the end groups | Branching agent of formula (V) [ppm] | YI |
|---|---|---|---|---|---|---|---|---|---|---|
| 3 | separately fused (170° C.) | separately fused (110° C.) | 1.205 | 960 | 29 | 1.281 | 260 | 11 | 26 | 5.4 |
| 4 | received as liquid (170° C.) | received as liquid (110 °C.) | 1.210 | 790 | 24 | 1.283 | 190 | 8 | 11 | 0.9 |
| 5 | received as liquid (170° C.) | separately fused (110° C.) | 1.206 | 1020 | 31 | 1.279 | 295 | 12 | 21 | 1.7 |
| 6 | separately fused (170° C.) | received as liquid (110° C.) | 1.208 | 820 | 25 | 1.280 | 320 | 13 | 30 | 4.9 |
| 7 | fused together with DPC (150° C.) | — | 1.203 | 910 | 27 | 1.281 | 315 | 13 | 18 | 1.8 |
| 8 | solid BPA, rendered inert with nitrogen, dissolved in DPC melt (140° C.) | separately fused (140° C.) | 1.208 | 830 | 25 | 1.282 | 270 | 11 | 13 | 1.3 |

We claim:

1. Two-stage, solvent-free, process for the manufacture of low-branched polycarbonate having a content of phenolic OH groups of less than 20%, and an average molecular weight of 9,000 to 24,000, by melt transesterification of diphenols, carbonic acid diaryl esters, catalysts and optionally branching agents at temperatures between 80° C. and 400° C. and pressures of 1000 mbar to 0.01 mbar, characterized in that for the first stage, the oligocarbonate synthesis, nitrogen or phosphorus bases are used in amounts of $10^{-2}$ to $10^{-8}$ mole, relative to 1 mole diphenol, and after addition of the catalyst and application of vacuum (from atmospheric pressure to 0.5 mbar) and raising of the temperature (up to 300° C.) an oligocarbonate is produced by distillation-off of monophenols, and the oligocarbonate is polycondensed in the second phase to the polycarbonate with the addition of alkali metal salts and alkaline earth metal salts in amounts of $10^{-4}$ to $10^{-8}$ mole, relative to 1 mole diphenol, at temperatures between 250° C. and 400° C. and pressures of less than 500 mbar to 0.01 mbar in a time less than 15 min, the oligocarbonate formed as an intermediate having an OH end-group content of more than 10% and less than 35% and further characterized in that the diphenols used or the carbonic acid diaryl esters used or the diphenols and the carbonic acid diaryl esters used have not passed through the solid phase after their manufacture or after their purification.

2. Process for the manufacture of aromatic polycarbonate in the melt according to claim 1, characterized in that the polycondensation is carried out in a high-viscosity reactor in less than 10 min.

3. Process for the manufacture of aromatic polycarbonate in the melt according to claim 1, characterized in that the polycondensation is carried out in a ZSK twin-screw kneader in less than 10 min.

4. Process for the manufacture of aromatic polycarbonate in the melt according to claim 1, characterized in that the oligocarbonate is isolated and thereafter polycondensed.

* * * * *